United States Patent [19]

Cohrs et al.

[11] 4,108,806

[45] Aug. 22, 1978

[54] THERMOPLASTIC EXPANDABLE MICROSPHERE PROCESS AND PRODUCT

[75] Inventors: William E. Cohrs, Midland; Roland E. Gunderman, Clare, both of Mich.

[73] Assignee: The Dow Chemical Company, Midland, Mich.

[21] Appl. No.: 427,298

[22] Filed: Dec. 21, 1973

Related U.S. Application Data

[63] Continuation of Ser. No. 205,289, Dec. 6, 1971, abandoned.

[51] Int. Cl.² .............................................. B01F 15/00
[52] U.S. Cl. ................................ 521/54; 260/28.5 R; 260/893; 260/899; 260/897 R; 521/56; 521/55
[58] Field of Search .......... 260/2.5 B, 2.5 E, 28.5 HA

[56] References Cited

U.S. PATENT DOCUMENTS

| | | | |
|---|---|---|---|
| 3,219,600 | 11/1965 | Rucker | 260/2.5 B |
| 3,353,981 | 11/1967 | Jacob | 260/2.5 B |
| 3,466,353 | 9/1969 | Turner | 260/2.5 B |
| 3,515,569 | 6/1970 | Walters et al. | 260/2.5 B |
| 3,615,569 | 6/1970 | Morehouse, Jr. et al. | 260/2.5 B |
| 3,673,126 | 6/1972 | Carmody et al. | 260/2.5 E |

*Primary Examiner*—Richard B. Turer

[57] ABSTRACT

Expandable synthetic resinous microspheres are expanded in a matrix by heating under pressure to at least a foaming temperature and permitting the microspheres to expand at a lower pressure.

7 Claims, No Drawings

THERMOPLASTIC EXPANDABLE MICROSPHERE PROCESS AND PRODUCT

This application is a continuation of our co-pending application Ser. No. 205,289, filed Dec. 6, 1971, now abandoned.

Expandable synthetic resinous microspheres are well known and described in U.S. Pat. No. 3,615,972. Such microspheres are small generally spherical particles having symmetrically encapsulated therein a droplet of a volatile liquid foaming agent. On heating to a temperature sufficient to heat plastify the thermoplastic shell and volatilize the fluid foaming agent, the microspheres expand to form a hollow synthetic resinous shell having a single gas-filled cell therein. Expandable microspheres are particularly desirable for a variety of applications. They can be readily shipped and handled in unexpanded form and find use in a wide variety of applications. Many thermoplastic resinous materials are difficult to foam, for example, polyolefins. In the formation of extruded cellular olefin polymers great care must be exercised in the selection of expanding agents and conditions for the preparation of such a foam.

It would be desirable if there were available an improved method for the expansion of synthetic resinous microspheres in a matrix.

It would also be desirable if there were available an improved method for the incorporation of expandable microspheres within a heat plastifiable matrix.

It would also be desirable if there were available improved synthetic resinous cellular materials.

These benefits and other advantages in accordance with the present invention are achieved in a process for the incorporation of expandable thermoplastic synthetic resinous monocellular microspheres having a thermoplastic resinous shell, a volatile fluid foaming agent therein within a heat plastifiable matrix material, the steps of the method comprising admixing the microspheres and matrix forming material, heat plastifying the matrix material and mechanically working the mixture to form a matrix about the microspheres without causing expansion thereof, subsequently passing the mixture into a zone of lower pressure wherein the microspheres expand to form a plurality of hollow, generally monocellular particles within the matrix and cooling the mixture below the heat plastifying temperature.

Also contemplated within the scope of the present invention is an extruded body comprising a continuous heat plastifiable matrix having therein a plurality of synthetic resinous microspheres, the microspheres being monocellular and having a resin shell having encapsulated therein as a distinct and separate phase a volatile fluid expanding agent.

Another desirable embodiment of the invention is an extruded body comprising a continuous heat plastifiable matrix having dispersed therein a plurality of expanded thermoplastic synthetic resinous gas-containing microspheres.

A wide variety of expandable synthetic resinous thermoplastic microspheres may be employed in the practice of the present invention. Some of such microspheres are set forth in U.S. Pat. No. 3,615,972, herewith incorporated by reference. The expandable microspheres useable in the practice of the present invention may be used in admixture with various matrix materials including synthetic resins, tars, waxes and the like. The only critical requirement for the matrix material is that it be heat plastifiable and at its heat plastification temperature it does not act as a rapid solvent for the microspheres to cause the destruction thereof by solvent action or heat plastify at a temperature sufficiently high that the microspheres are destroyed by thermal degradation. The products of the invention and the process are readily carried out employing a wide variety of processing equipment. An autoclave, beneficially agitated, or similar pressure vessel, can conveniently be employed for heating of the expandable microspheres and matrix forming material. Particularly desirable equipment for the practice of the present invention is a screw extruder which may be of the reciprocating screw type wherein a microsphere-matrix mixture may be processed employing more or less conventional extrusion, or screw injection molding techniques. Surprisingly, the expandable microspheres pass through conventional extrusion equipment without significant destruction thereof. Various synthetic resins beneficially are admixed with expandable microspheres and extruded to provide a foamed product, or alternately, by reducing the temperature of the extrude adjacent the die, the solid resinous matrix is extruded which contains the unexpanded microspheres. Such an unexpanded product may then be heated at a later time to cause expansion at ambient pressure. Beneficially when employing synthetic resinous matrices, it is generally desirable to provide the resin in a finely divided form to facilitate admixture with the microspheres. The finely divided (passing 50 mesh screen US Sieve Size) particulate resin is particularly advantageous when a screw extruder or screw injection molding machine is employed, and neither of these devices provides a high level of mixing of the heat plastified resin within the apparatus. Desirably, when a heat plastifiable matrix is employed for the preparation of the microsphere-containing product, a wide variety of additives may be utilized including dyes, pigments, fillers and plasticizers. Particularly advantageous are glass reinforcing fibers. The proportion of microspheres employed may be varied within wide limits depending on the particular nature of the product desired. Beneficially, as little as about 0.01 weight percent of microspheres can be utilized wherein the end product desirably has a density approximating that of the resin. Beneficially, such a mixture is particularly advantageous for injection molding of articles having thick sections. The presence of a minor amount of expandable microspheres prevents or reduces the tendency of the molded articles to show sink marks. Alternately, useful products are obtained when up to 99 weight percent of the expandable microspheres are employed with the matrix when very low density products are desired. One particularly advantageous embodiment of the invention is expandable granules prepared by extrusion of a synthetic resinous material with unexpanded microspheres to provide a plurality of pellets or beads containing unexpanded microspheres. Such particles can then be molded and formed by conventional steam chest molding procedures which are widely used with expanded polystyrene granules. The use of expandable microspheres provides synthetic resinous foam having a generally uniform small cell size and permits blowing agent retention in cases where such retention would not occur for a desirable length of time without the expandable microspheres, for example, polyolefins such as polyethylene are readily processed by conventional techniques to provide an expandable granule but such granules have a useful life which is much too short for most commercial applications. In contrast, by employing expandable microspheres a molding grade granule is readily prepared which has a shelf life in excess of six months.

The invention is further illustrated but not limited by the following examples.

EXAMPLE 1

A plurality of blends of resin and an expandable microsphere having a polymer shell of about 60 percent styrene, 40 weight percent acrylonitrile having encapsulated therein a distinct and separate droplet of isobutane (about 20 percent by weight of the microspheres) and 10 parts by weight of the microspheres are employed with 80 parts by weight of resin and the resulting mixture extruded from a screw extruder under the various conditions set forth in Table I.

shell of 75 parts by weight vinylidene chloride, 25 parts by weight acrylonitrile and containing about 20 weight percent neopentane. The mixture is extruded at a temperature of about 130° C. The product obtained is a fine-celled rubbery foam.

As is apparent from the foregoing specification, the present invention is susceptible of being embodied with various alterations and modifications which may differ particularly from those that have been described in the preceding specification and description. For this reason, it is to be fully understood that all of the foregoing is intended to be merely illustrative and is not to be construed or interpreted as being restrictive or otherwise limiting of the present invention.

What is claimed is:

1. A process for the incorporation of expandable

TABLE I

| SAMPLE NO. | FOAM COMPOSITION Polymer Matrix | Wt. % | Wt. % $MS_1$ | Temperatures, °F. Zone 1 | Zone 2 | Die | Screw Speed$_2$ | Die Press$_3$ | Screen Pak | Slot Die | No Die | FOAM DENSITY$_4$ |
|---|---|---|---|---|---|---|---|---|---|---|---|---|
| 1 | Blend of 90 | 80 | 10 | 200 | 400 | 350 | 20 | 900 | X | | | 59.1 |
| 2 | weight percent | | | 200 | 350 | 305 | 20 | 1000 | X | | | 38.1 |
| 3 | high density poly- | | | 200 | 300 | 270 | 20 | 1200 | X | | | 26.4* |
| 3A | ethylene with 10 | | | 200 | 300 | 270 | 20 | 1200 | X | | | 38.3 |
| 4 | weight percent | | | 200 | 275 | 250 | 20 | 2700 | X | | | 24.6 |
| 5 | copolymer of about | | | 200 | 275 | 250 | 25 | 3500 | X | | | 19.9 |
| 6 | 80 weight percent | 285 | 260 | 20 | 1200 | X | | 24.3 | | | | |
| 7 | ethylene with 20 | | | 200 | 280 | 250 | 20 | 3200 | X | | | 21.4 |
| 8 | weight percent | | | 200 | 280 | 250 | 55 | 900 | | X | | 19.3 |
| 9 | vinyl acetate | | | 200 | 280 | 250 | 55 | 0 | | | X | 28.5 |
| 1 | Copolymer of | 90 | 10 | 200 | 280 | 260 | 45 | 500 | X | | | 30.5 |
| 2 | about 80 weight | | | 200 | 265 | 250 | 60 | 900 | X | | | 19.9 |
| 3 | percent ethylene | | | 200 | 265 | 250 | 83 | 900 | X | | | 16.7 |
| 4 | with 20 weight | | | 200 | 265 | 250 | 20 | 200 | X | | | 17.4 |
| 5 | percent vinyl acetate | | | 200 | 265 | 250 | 60 | 900 | X | | | 23.7 |
| 1 | ABS resin | 90 | 10 | 400 | 400 | 350 | 20 | 200 | X | | | 59.6 |
| 2 | commercially available as "Tybrene" | | | 210 | 400 | 350 | 47 | 200 | X | | | 48.6 |
| 1 | Butadiene | 90 | 10 | 200 | 300 | 270 | 20 | 800 | X | | | 19.75 |
| 2 | rubber avail- | | | 200 | 360 | 285 | 20 | 200 | X | | | 42.2 |
| 3 | able under the | | | 200 | 350 | 305 | 72 | 500 | X | | | 36.7 |
| 4 | trade designa- | | | 200 | 400 | 325 | 20 | 150 | X | | | 50.9* |
| 4A | tion of "Tufprene" | | | 200 | 400 | 325 | 20 | 150 | X | | | 63.75 |
| 5 | | | | 200 | 400 | 325 | 72 | 500 | X | | | 46.4* |
| 5A | | | | 200 | 400 | 325 | 72 | 500 | X | | | 53.6 |

FOOTNOTES:
$^1$ = weight percent microspheres
$^2$ = revolutions per minute
$^3$ = pounds per square inch gauge
$^4$ = pounds per cubic foot
* = water cooled The densities of the resultant products are measured. In each case, the product is a uniform, fine-celled foam showing no evidence of rat holes or other significant imperfections.

EXAMPLE 2

The product extruded from Run 1 is divided into a plurality of pellets measuring about ⅛ by ⅛ by ¼ inch and placed in a hollow metal mold which in turn is placed in a circulating air oven having a temperature of about 150° C. for a period of about 30 minutes. The mold is subsequently removed from the air oven and cooled to ambient temperature. On opening the mold and removing the contents the particles are found to have foamed to fill the mold and form a unitary reproduction of the internal configuration of the mold.

EXAMPLE 3

The procedure of Example 1 is repeated using a mixture of 60 parts by weight of a polyvinyl chloride plastisol grade resin commercially available as "Geon 121", 40 parts by weight of di-(2-ethylhexyl)phthalate and 6 parts by weight of expandable microspheres having a thermoplastic synthetic resinous monocellular microspheres having a thermoplastic resinous shell, a volatile liquid foaming agent therein within a heat plastifiable matrix material which, at its heat plastification temperature does not act as a rapid solvent for the microspheres to cause the destruction thereof by solvent action or heat plastify at a temperature sufficiently high that the microspheres are destroyed by thermal degradation, the steps of the method comprising admixing the microspheres and matrix forming material, heat plastifying the matrix material and mechanically working the mixture to form a matrix about the microspheres without causing expansion thereof, subsequently passing the mixture into a zone of lower pressure wherein the microspheres expand to form a plurality of hollow, generally monocellular particles within the matrix, and cooling the mixture below the heat plastifying temperature.

2. The method of claim 1 wherein the unexpanded microspheres are heated under pressure in a screw extruder.

3. The method of claim 1 wherein the unexpanded microspheres are in admixture with a thermoplastic synthetic resinous binder.

4. The method of claim 3 wherein the thermoplastic binder is heated to a temperature sufficient to cause heat plastification thereof.

5. The method of claim 3 wherein the binder is a wax.

6. A method of preparing a heat expandable product, the steps of the method comprising providing a mixture of heat expandable synthetic resinous microspheres capable of expanding on heating to form monocellular hollow gas-filled spheres within a thermoplastic synthetic resin, heating the mixture to a temperature sufficient to heat plastify the resin under pressure sufficient to prevent expansion of the microspheres, shaping the mixture to a desired configuration, and cooling the mixture below the heat plastifying temperature of the resin.

7. The method of claim 6 wherein the resin is polyethylene.

* * * * *

UNITED STATES PATENT AND TRADEMARK OFFICE
CERTIFICATE OF CORRECTION

PATENT NO. : 4,108,806
DATED : August 22, 1978
INVENTOR(S) : William E. Cohrs, Roland E. Gunderman It is certified that error appears in the above-identified patent and that said Letters Patent are hereby corrected as shown below:

Column 3, in TABLE I, line beginning Sample No. 6   80 weight persent, delete "285"; delete "260"; delete "20" and insert --200; delete "1200" and insert --285--' delete "X" and insert --260--; insert --20--; insert --1200--; delete "24.3" and insert --X--; insert --24.3--.

Signed and Sealed this

Thirteenth Day of March 1979

[SEAL]

Attest:

RUTH C. MASON
Attesting Officer

DONALD W. BANNER
Commissioner of Patents and Trademarks